Figure 1:
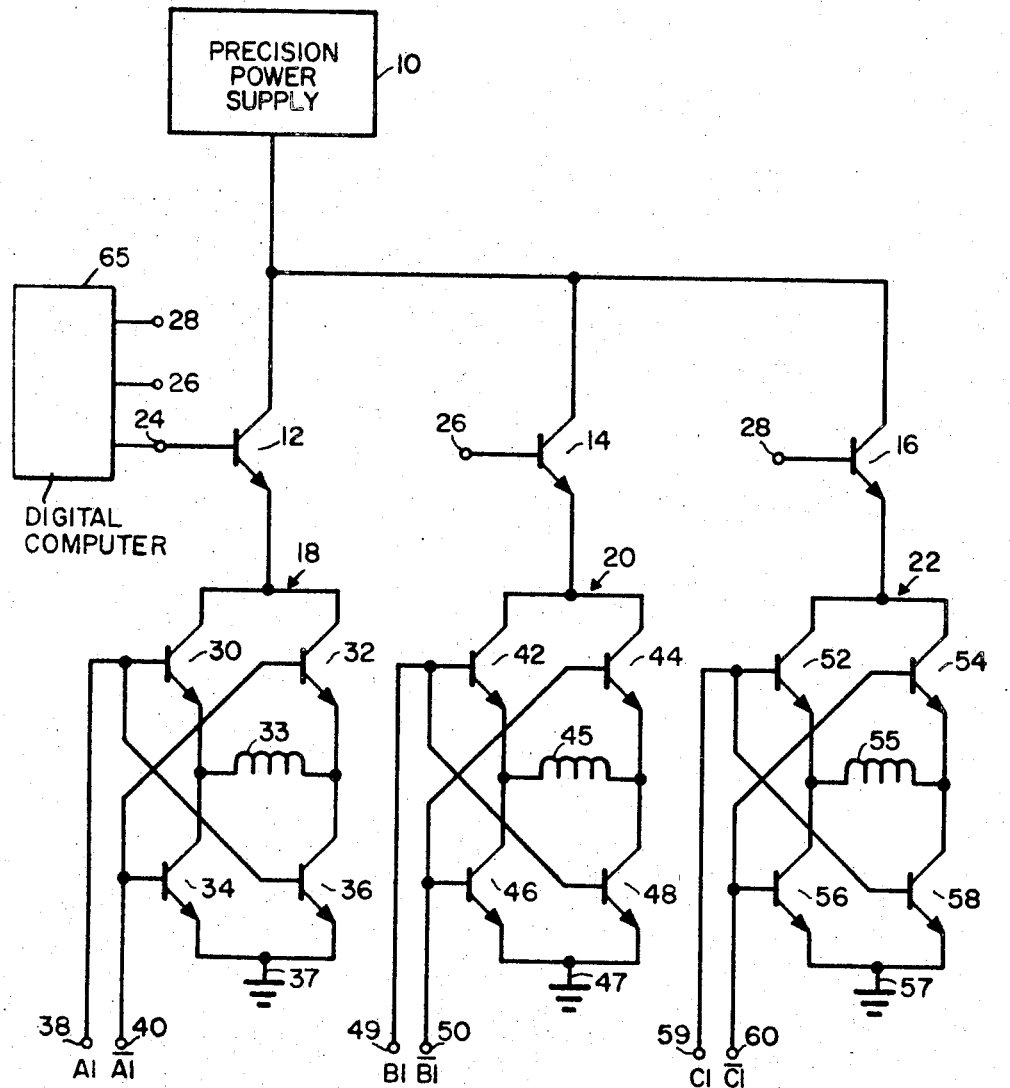

INVENTOR.
THEODORE A. CONANT

United States Patent Office 3,403,316
Patented Sept. 24, 1968

3,403,316
DIGITAL CONTROL SYSTEM FOR
GYRO TORQUERS
Theodore A. Conant, Jr., Sylmar, Calif., assignor to General Precision, Inc., a corporation of Delaware
Filed May 17, 1965, Ser. No. 456,101
6 Claims. (Cl. 318—436)

This invention relates to digital control systems and, more particularly, to a control system for controlling a gyroscope torquer or the like with digital signals.

It is well known in the art that various torques applied to gyroscopes cause errors to be produced in those gyro systems. For instance, navigation systems of modern day use employ stable platforms which consist of three degrees of stabilization, pitch, roll and yaw. Each degree of stabilization requires a gyroscope; therefore, in systems such as this, various torques from outside interruptions are introduced into these three gyros. Heretofore the error signals developed by these torques have been detected by various types of pickoffs and relayed to the torque correction systems by the use of well known servo techniques.

In modern and more precision navigation systems, a digital computer has been introduced into the gyro correction loops for automatic compensations in the gyro systems when torques are introduced by outside sources. A problem now arises when a digital computer is used in a torquing system, and that is the torques introduced into the digital computer from the gyros themselves are in analog forms and an analog-to-digital converter is used for introducing this information into the digital computer. On the other hand, when the output from the digital computer is to be introduced into the torquers used for correction in the gyros, a digital-to-analog converter must be used.

Briefly described, this invention provides a digital pulse gyro torquing system which uses a transistor bridge for each gyro used in a stable platform or the like that controls the direction of current through a torquer by digital application of pulse signals to the bridge network in an alternate fashion. A constant current source is used that is gated cyclically into each of the bridges and allows a continuous current flow into each bridge circuit by continuously applying counterpulses to a plurality of digital switches in a cyclic manner.

One feature of this invention is that it does not require a dummy load for dissipating current to maintain a stability of constant current. This invention provides dissipation constantly through the regular load without affecting the circuit itself, thereby improving the power utilization efficiency.

One object of this invention is to provide a gyro torquing system used in connection with a digital computer, that actually operates the torquers from digital pulses.

Another object of this invention is to provide a gyro torquing system that requires no dummy loads for dissipation of a precision power supply.

Another object of this invention is to provide a gyro torquing system that is digital and has no need to convert the digital signals from the computer to analog signals for use in the torquer.

Figure 2:
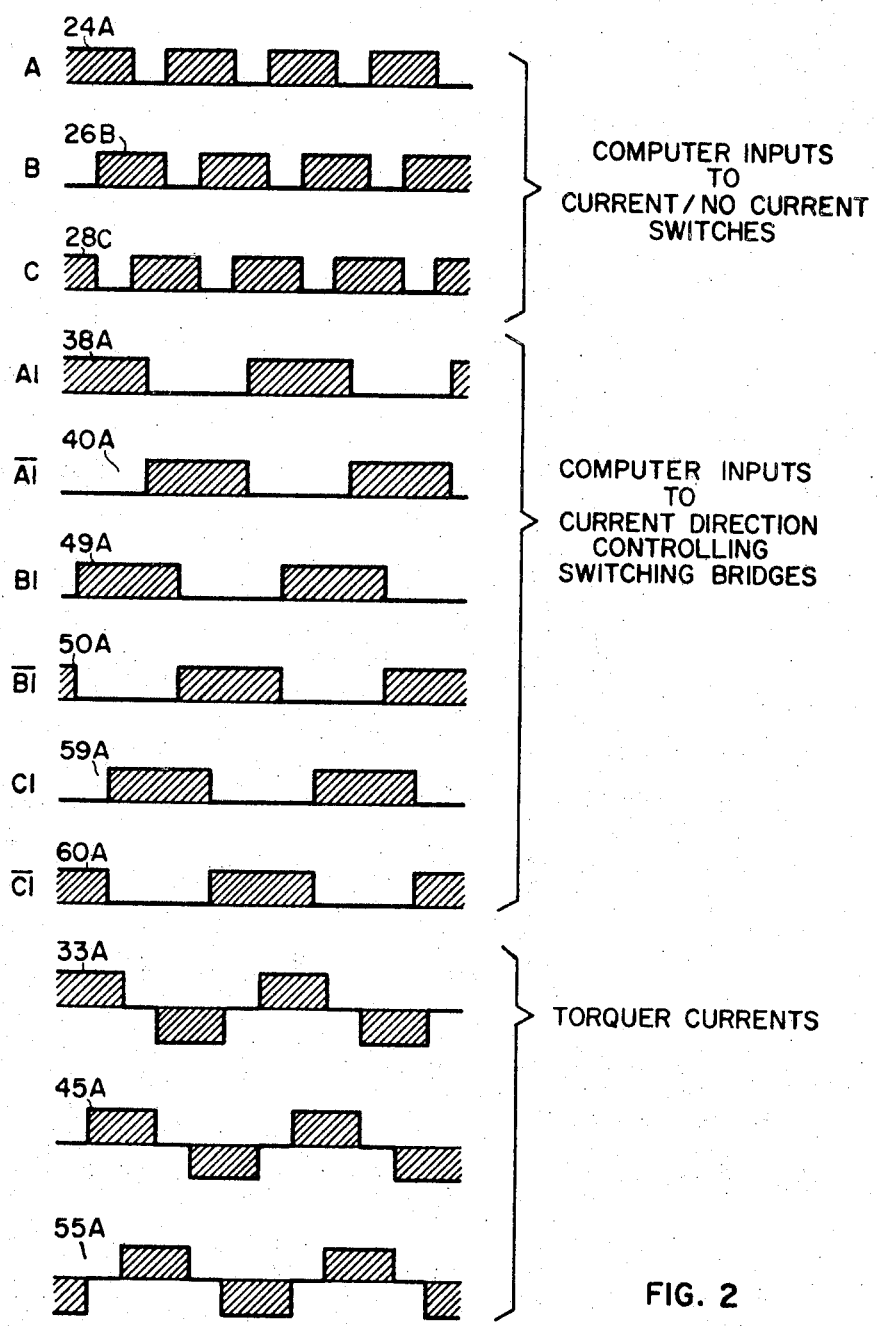

Other objects and many attendant advantages of this invention will be readily appreciated as the same becomes better understood by references to the following detailed description when considered in connection with the accompanying drawings in which like reference numerals designate like parts throughout the figures thereof and wherein:

FIGURE 1 is a schematic drawing of this invention illustrating one embodiment of this invention; and FIGURE 2 is a graph of various pulse signals emanating from a digital computer which are applied to various inputs of the schematic drawing of FIGURE 1.

Turning now to a more detailed description of this invention, there is shown in FIGURE 1 a precision power supply 10 which supplies a constant current to three transistor switches 12, 14 and 16 connected in parallel. The constant current emanating from precision power supply 10 is connected to each transistor switch at its collector. The emitter of transistor 12 is coupled to a transistor bridge 18; the emitter of transistor 14 is coupled to a transistor bridge 20; and the emitter of transistor switch 16 is coupled to a transistor bridge 22. Each of the transistor switches 12, 14 and 16 receive a chain of pulses from computer 65 which are continuously applied to terminals at their base electrodes respectively. The terminal 24 of transistor switch 12 may receive a pulse shaped similar to the chain of pulses 24A of the graph in FIGURE 2. The terminal 26 of the base of transistor switch 14 receives a similar signal 26B shown in FIGURE 2 which is delayed one-half the positive pulse of the signal on terminal 24, and finally the terminal 28 of the base of transistor switch 16 provides a signal similar to the signal 28C in FIGURE 2, which is delayed one-half the pulse of the signal on terminal 26.

It can be seen from the position of the pulses and their application to the transistor switches 12, 14 and 16 that only in a cyclic manner two of these switches are turned on at one time and the third will be turned off.

Transistor bridge 18 is composed of transistors 30 and 32 which have their collectors coupled together and coupled to the emitter of transistor 12. The emitters of transistors 30 and 32 are coupled across a torquer winding 33. Transistors 34 and 36 have their emitters coupled together and coupled to a ground connection 37. The collector of transistor 34 is coupled to the torquer winding 33 and to the emitter of transistor 30. The collector of transistor 36 is coupled to the other end of the torquer winding 33 and to the emitter of transistor 32. The bases of transistors 36 and 30 are coupled together and in turn coupled to a terminal 38. The bases of transistors 34 and 32 are coupled together and to the terminal 40. The terminal 38 is designated A1 and the terminal 40 will be designated $\overline{A1}$. Input signals are applied to the terminals 38 and 40 that are digital pulses as represented by the signals 38A and 40A in the graph in FIGURE 2, whereby one side of the bridge is enabled allowing current to flow through the torquer winding 33 in one direction for one cycle of the pulse of 38A, and is reversed allowing current to flow in the opposite direction in winding 33 in the pulse time of 40A. Therefore, during all times that the system is in operation a pulsating signal is applied to both sides of the bridge 18 continuously allowing the current to flow through the torquer winding 33 in alternate directions and nulling the torquer winding 33.

Transistor bridges 20 and 22 are connected in the same manner. The collector of transistor 42 is coupled to the collector of transistor 44, and they are in turn coupled to the emitter of transistor switch 14. The emitter of transistor 42 is coupled to one side of a torquer winding 45 and the other end of torquer winding 45 is coupled to the emitter of transistor 44. Transistor 46 has its emitter coupled to a ground 47 and its collector coupled to one side of the torquer winding 45 and to the emitter of transistor 42. Transistor 48 has its emitter coupled to the emitter of transistor 46 and to the ground 47, and its collector coupled to one end of the torquer winding 45 and to the emitter of transistor 44.

The last transistor bridge 22 shown in FIGURE 1 is coupled in the same manner as the other bridges, with the collector of transistor 52 coupled to the collector of transistor 54 and to the emitter of transistor swtich 16. The emitter of transistor 52 is coupled to one end of a torquer winding 55, the other end of which is coupled to the emitter of transistor 54. The collector of transistor 56 is coupled to the emitter of transistor 52 and to one end of the torquer winding 55. The emitter of transistor 56 is coupled to the ground 57. Transistor 58 has its collector coupled to the end of winding 55 and to the emitter of transistor 54. The emitter of transistor 58 is coupled to the ground 57. In this embodiment all transistors are of the NPN type which allows all control pulses to be positive in polarity. It is obvious that if negative control pulses are to be used, then PNP transistors may be substituted.

Transistor bridge 20 receives inputs 49A and 50A, as shown in FIGURE 2, designated B1 and $\overline{B1}$ at the terminals 49 and 50 which are coupled to the base of transistor 46 and wherein the terminal 50 is coupled to the base of transistor 46 and the base of transistor 44, and the terminal 49 is coupled to the base of transistor 42 and the base of transistor 48.

Transistor bridge 22 receives inputs from terminals 59 and 60 wherein the terminal 59 is coupled to the base of transistor 52 and the base of transistor 58, and the terminal 60 is coupled to the base of transistor 54 and the base of transistor 56. Terminals 59 and 60 receive signals designated C1 and $\overline{C1}$ which are shown in FIGURE 2 and denoted as 59A and 60A.

When the signals A1, $\overline{A1}$, B1, $\overline{B1}$, C1, $\overline{C1}$ are applied to the terminals 38, 40, 49, 50, 59, 60 in the manner and time relationship as shown in FIGURE 2, the torquer currents will be those that are depicted in FIGURE 2 and denoted as 33A for torquer winding 33 in transistor bridge 18, 45A for torquer winding 45, and 55A as shown and applied to the torquer winding 45.

During the operation of the invention, pulses applied to terminals 24, 26 and 28 of transistor switches 12, 14 and 16 are cyclic in manner for only two of the three switches are enabled at any one time, as the graph in FIGURE 2 will indicate. Therefore, current will always flow into two of the three transistor bridges 18, 20 and 22 at any one time or during any one cycle.

Terminal 38 of the bridge 18 receives a positive signal A1 allowing current to flow through transistor 30, through the torquer winding 33, through the transistor 36, to the ground 37, because the positive pulse applied to the base of these transistors renders them conductive. At this time, no signal $\overline{A1}$ is on the terminal 40 and transistors 32 and 34 are nonconductive. During the next cycle the pulses on terminals 38 and 40 alternate; where terminal 38 has no signal $\overline{A1}$ and terminal 40 has a positive pulse A1. Now transistors 32 and 34 are conductive and allowing current to flow in the opposite directions in the torquer winding 33. The other transistor bridges 20 and 22 operate in a similar manner, when pulses B1 and $\overline{B1}$ and C1 and $\overline{C1}$ are applied alternately to terminals 49 and 50 and 59 and 60, respectively.

The string of pulses applied to the terminals 38 and 40, 49 and 50, and 59 and 60 are timed with the pulses applied to the terminals 24, 26 and 28 of the transistor switches 12, 14 and 16, respectively, so that current is always flowing from the current source 10 to assure constant and precision power dissipation.

If a change is to be introduced into a torquer winding from the digital computer 65, a change in the input signals A1, B1 or C1 to the appropriate torquer winding 33, 45 or 55, an increase is made in the number or duration of positive pulses applied to the appropriate terminal, depending upon the direction of the change with respect to the direction the current flows in the torquer winding 33, 45 or 55.

Control signals applied to the transistor bridges 18, 20 and 22 are continuously applied to the input terminals at such a rate that the torquer windings are not affected unless there is a change in the chain of input pulses. For instance, taking one torquer winding 33 and applying the signals A1 and $\overline{A1}$ to the input terminals 38 and 40 where the signals A1 and $\overline{A1}$ are applied alternately, A1 and $\overline{A1}$ being complementary to the other, the torque, or degree of turns, applied to the torquer winding 33 is the net effect of A1 and $\overline{A1}$.

If an equal amount of A1 and $\overline{A1}$ signals are applied to the terminals 38 and 40, the signal across the torquer winding 33 is that of 33A as shown in FIGURE 2 and the net effect on the gyro torquer is zero. To turn the torquer in a particular direction more A1 signals may be applied to terminal 38 than $\overline{A1}$ signals, and if the torquer is to turn in the opposite direction then more A1 signals are applied to terminal 40 than $\overline{A1}$ signals.

Thus:

$$\left(\frac{N-M}{N+M}\right)RK = \text{amount of turn}$$

where $N$=the number of positive pulses, $M$=the number of negative pulses, $R$=pulses per hour and K is a constant for degrees of rotation for a single pulse.

With this device there is no need for change in the control pulse frequency or modulation to activate a torquer. The only changes required in pulse are the number of pulses to a torquer winding. This is done with the above method and by using only positive signals on the transistor bridges 18, 20 and 22 from a single polarity current from the power supply 10.

Having thus explained a preferred embodiment of this invention what is claimed is:

1. A digital control system for controlling a gyroscope system with a digital computer comprising: a constant current source, a plurality of torquers, means coupling said torquers to said constant current source for alternately enabling a preselected number of different torquers at all times with digital signals obtained from said digital computer, and a current directing means coupled to said torquers for directing current through each said torquer in alternate directions.

2. A digital control system for controlling a gyroscope system with a digital signal comprising: a constant current source, a plurality of torquers for stabilization of said gyroscope system, means for always maintaining said current source coupled to a preselected number of different ones of said plurality of said torquers in a cyclic manner, and a bridge circuit associated with each said torquer for applying current at preselected polarities to each of said preselected torquers in response to said cyclic coupling means.

3. A digital control system as set forth in claim 2 wherein said bridge circuit associated with each said torquer includes two input paths for each polarity of said torquer and wherein only one of said input paths is enabled at a time.

4. A digital control system for controlling a gyroscope system with digital signals comprising: a constant current source, a plurality of gyro torquers coupled in parallel to said current source, a transistor switch coupled between each said torquer and said current source, each having an emitter, a collector and a base, said base of each said transistor switch being adapted to cyclically receive pulses whereby a preselected number of different ones of said transistor switches are adapted for conducting simultaneously in a periodic alternating manner, a transistor bridge associated with each said gyro torquer and a different corresponding transistor switch, each of said transistor bridges being responsive to the conducting condition of its corresponding transistor switch to permit current from said current source to flow through its associated gyro torquer, and input means coupled to said transistor bridges for controlling the direction of flow of said current through each said associated gyro torquer.

5. A control system as set forth in claim 4 wherein each said transistor bridge comprises a first pair of transistors coupled to allow current from said constant current source to flow through said associated torquer in a specific polarity, and a second pair of transistors coupled to allow current from said constant current source to flow through said associated torquer in an opposite polarity.

6. A control system as set forth in claim 5 wherein said input means comprises one input path coupled to said first pair of transistors and a second input path coupled to said second pair of transistors.

References Cited

UNITED STATES PATENTS 3,354,366  11/1967  Landy et al. _____ 307—41 XR

ORIS L. RADER, *Primary Examiner.*

K. L. CROSSON, *Assistant Examiner.*